United States Patent [19]

Himmelheber

[11] Patent Number: 5,304,705
[45] Date of Patent: Apr. 19, 1994

[54] DEPOSITORY FOR STORING RADIOACTIVE WASTE

[76] Inventor: Max Himmelheber, Saarstrasse 7, 7292 Baiersbronn, Fed. Rep. of Germany

[21] Appl. No.: 911,467

[22] Filed: Jul. 10, 1992

[30] Foreign Application Priority Data

Jul. 12, 1991 [DE] Fed. Rep. of Germany ....... 4123034

[51] Int. Cl.⁵ .................................................. B09B 1/00
[52] U.S. Cl. .................................... 588/252; 588/249; 405/128
[58] Field of Search ............... 588/249, 250, 252, 259; 405/128

[56] References Cited

U.S. PATENT DOCUMENTS

| | | | |
|---|---|---|---|
| 4,131,563 | 12/1978 | Bähr et al. | 588/252 X |
| 4,139,488 | 2/1979 | Knotik et al. | 588/252 |
| 4,453,857 | 6/1984 | Serra et al. | 588/252 X |
| 4,844,840 | 7/1989 | Feizollahi | 405/128 X |
| 4,906,408 | 3/1990 | Bounia | 405/128 X |
| 4,950,426 | 8/1990 | Markowitz et al. | 405/128 X |
| 4,955,983 | 9/1990 | Meess et al. | 405/128 |
| 4,973,195 | 11/1990 | Sweeney et al. | 405/128 |

*Primary Examiner*—Dennis L. Taylor
*Assistant Examiner*—J. Russell McBee
*Attorney, Agent, or Firm*—Robert W. Becker & Associates

[57] ABSTRACT

A depository for storing radioactive waste is comprised of a material such as natural rock, magmatic rock, or concrete. The construction body has an interior storage chamber. The size and the wall thickness of the construction body prevent emission of radioactive radiation during a projected storage time of several thousand years. The construction body is designed to provide a free, stable support on a concave to flat ground surface so that a displacement of the construction body due to tectonic movements of the earth's crust does not have an effect on its free and stable support. Preferably, the construction body has the shape of a tetrahedron.

18 Claims, 2 Drawing Sheets

Fig. 4
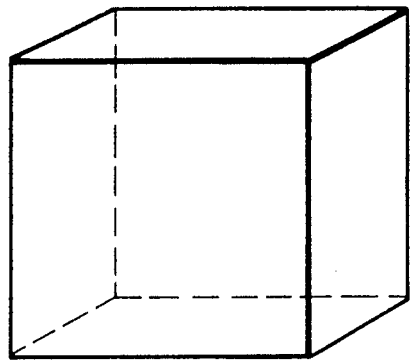
Fig. 5
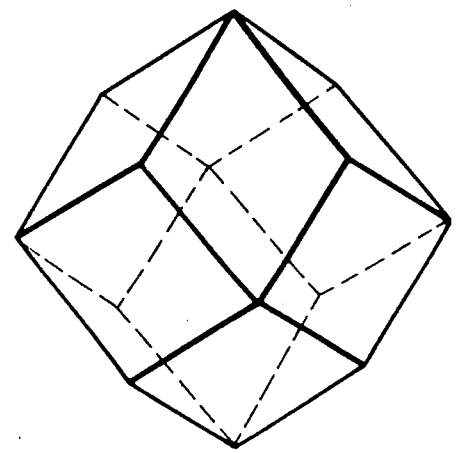
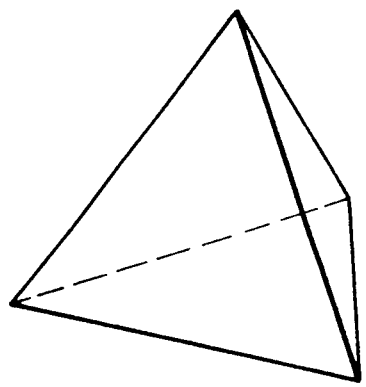
Fig. 8
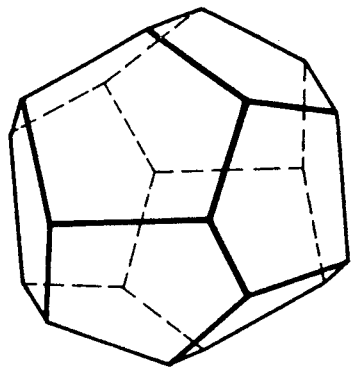
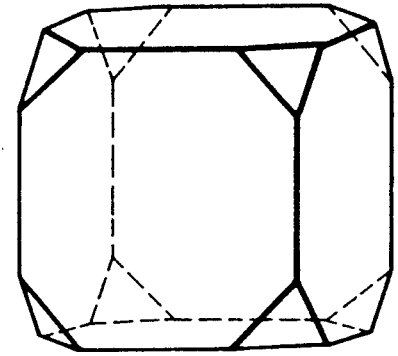
Fig. 6
Fig. 7

DEPOSITORY FOR STORING RADIOACTIVE WASTE

Background of the Invention

The present invention relates to a depository for storing radioactive wastes comprising a construction body of at least one of the following exemplary materials such as magmatic rock, concrete, or similar materials.

The storing of radioactive materials and wastes, especially of highly radioactive materials, requires a secure shielding of the radioactive material for 20 times the half-life of the radioactive material. For example, plutonium requires a storage time of 480,000 years, and radioactive iodine requires a storage time of millions of years. For such a storing of highly radioactive materials there is no place on earth which over geological time would not come into contact with the ecosphere. All of the past and current measures therefore are directed to relatively short-term storage. The storage of highly radioactive materials in salt mines is impossible because carnolyte enclosures (highly concentrated hot brine) have been discovered and it is known that these enclosures generate molten channels to the substratum or to the exterior of the salt mine, so that radioactively contaminated salt material may be introduced into the ground water.

A storage in limestone is impossible due to the stratification of the limestone with interposed water guiding layers. In mountainous countries such as Switzerland the possibility of storing radioactive material, for example, in the Gotthard mountain range has been investigated. The storage in such mountain tunnels over a time period of thousands of years is unsafe because such a storage in mountain ranges is subject to strong lateral folding pressure of the continental plates. These continental plates may move about 12 cm per year in a horizontal direction and simultaneously move with a vertical component so that mountain plates may be shifted on top and underneath one another. According to geological findings, the central European Alps grow faster than they erode. Without the natural hazard of continental drifts the parent rock of the Alps would be a safe enclosure material for radioactive materials.

In America, the timely limited storage of radioactive materials in respectively large concrete bunkers is known which for safety reasons are anchored against earth movements via especially constructed stable foundations within the ground. However, no detailed knowledge has been derived over what time periods a safe storage of radioactive materials in such concrete bodies anchored within the ground is possible and how these concrete bodies will react due to their rigid anchoring within the ground when earth movements occur.

It is therefore an object of the present invention to provide a depository for radioactive material which allows a safe storage of radioactive material for time periods of hundreds of thousands of years without compromising the safety of the depository due to geological influences such as earth movements, earthquakes and/or erosion.

BRIEF DESCRIPTION OF THE DRAWINGS

This object, and other objects and advantages of the present invention, will appear more clearly from the following specification in conjunction with the accompanying drawings, in which:

FIG. 4 shows a building block in the form of a cube;

FIG. 5 shows another embodiment of the building block as a rhombic dodecahedron;

FIG. 6 shows a further embodiment of the building block as a pentagonal dodecahedron;

FIG. 7 shows a cubic building block with a superimposed octahedron;

FIG. 8 shows a building block in the shape of a tetrahedron.

SUMMARY OF THE INVENTION

Figure 1:
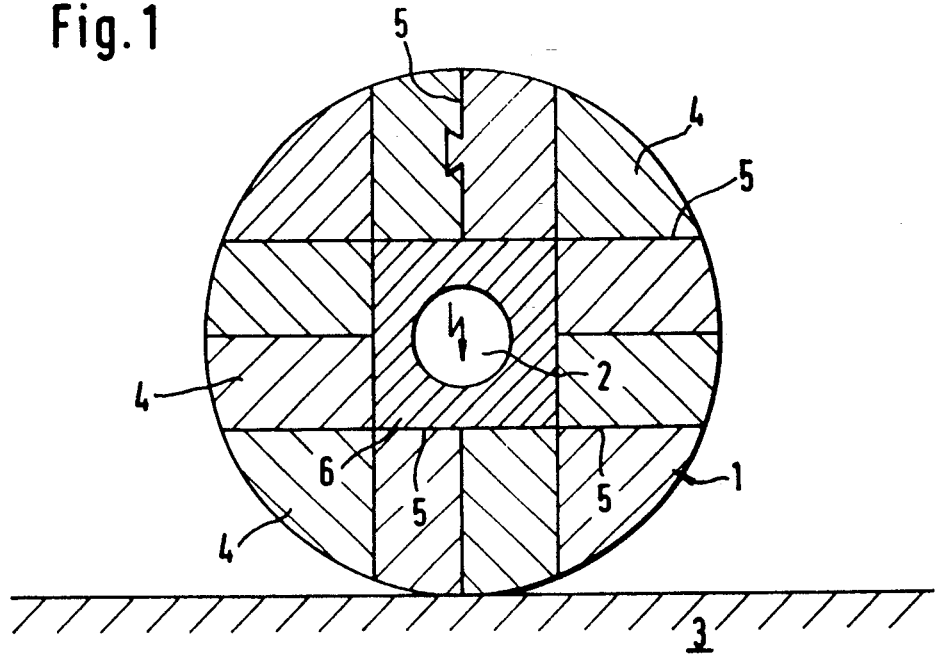
FIG. 1 shows a spherical construction body with an interior storage chamber.
Figure 2:
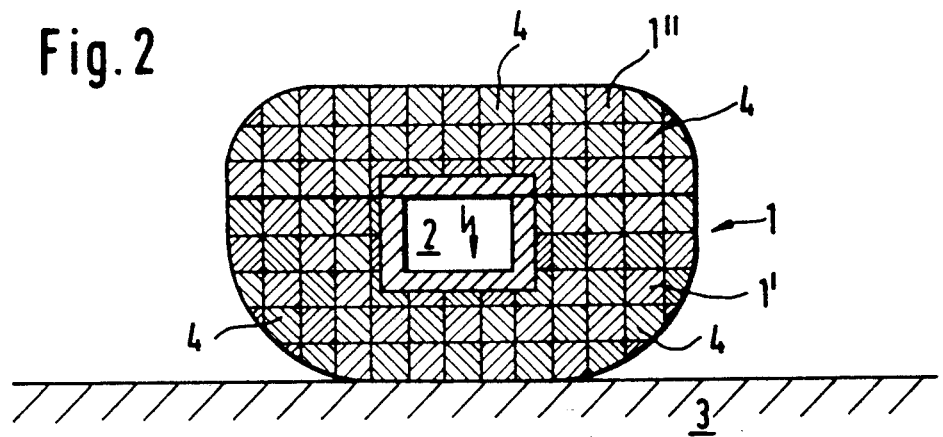
FIG. 2 shows a construction body with a bottom portion and a cover portion.

The depository for storing radioactive waste according to the present invention is comprised of a construction body of at least one of the materials selected from the group consisting of natural rock, magmatic rock, or concrete, the construction body having an interior storage chamber and having a size and a wall thickness preventing emission of radioactive radiation during a projected storage time of several thousand years, the construction body designed to provide a free, stable support on a concave to flat ground surface such that a displacement of the construction body due to tectonic movements of the earth's crust does not have an effect on its free, stable support, respectively, displacement or movements of the construction body due to tectonic activity of the earth's crust are prevented. Preferably, the construction body has the shape of a tetrahedron. In other preferred embodiments, the construction body has a shape selected from the group consisting of a cube, a rhombic dodecahedron, and a sphere, the construction body having an at least approximately planar outer surface portion that provides its free stable support.

It is advantageous that the construction body has an outer surface with at least portions of that outer surface having a convex contour. Preferably, the construction body has the shape of a spherical cup. In another preferred embodiment, the construction body is at least approximately semi-spherical. It is also possible to provide the construction body in the shape of an oval bowl.

Advantageously, the construction body is comprised of at least two stacked portions (a bottom and a cover portion) connected to one another in a radiopaque manner. Preferably, the two portions are at least approximately semi-spheres.

Preferably, the construction body is at least partially comprised of rock that is weather- and erosion-resistant. Expediently, this rock is natural rock such as basalt or granite.

In an advantageous embodiment, the construction body is comprised of individual building blocks. The building blocks have form-fitting surface areas for stacking the building blocks in a radiopaque manner. Preferably, the stacking of the building blocks is radiopaque without providing binding means or binder material. It is also possible to provide a radiopaque binder material for jointingly connecting the building blocks to one another.

Expediently, the construction body comprises a support frame for supporting the interior storage chamber within the construction body. The interior storage chamber is comprised of a radiopaque material, i.e., it has an enclosure of a radiopaque material. The radiopaque material is preferably lead and/or concrete.

Advantageously, the center of gravity of the construction body is located in its bottom half or bottom portion. It is furthermore advantageous, that the construction body has an outer surface with surface-increasing projections for increasing heat dissipation. Preferably, the surface-increasing projections are ribs.

Advantageously, the inventive construction body is at least partially provided with a flat or convex outer surface in the area where it is supported, respectively, where its foundation is located so that the construction body will not change or change only to a minimal extent its position during tectonic earth movements due to its free and stable support. For this purpose, the construction body may advantageously have an at least approximately spherical shape or the shape of a polyhedron, preferably a tetrahedron, a cube (hexahedron), a rhombic dodecahedron, a pentagonal dodecahedron, or a cube with flattened corners (superimposed octahedron). In order to achieve the free movability of the construction body relative to the ground surface, the construction body may be provided in the form of a spherical cup, preferably in the form of a semi-sphere or in the form of a semi-polyhedron. It is also possible to embody the construction body in the form of an oval cup or bowl which, with its convex outer surface, forms the free and stable support of the construction body on the ground. When the construction body is embodied as a semi-polyhedron or semi-sphere or an oval cup or bowl, a second such semi-portion (cover portion) may be placed on the bottom portion for providing an enclosed construction body. Of course, the combined halves of the construction body may have other shapes than the aforementioned ones. Cup-like rounded construction bodies according to the present invention will only perform rocking movements during tectonic changes, but essentially remain at the same location. The construction body is expediently comprised of individual building blocks which are made from basalt, granite or other natural rock. When such building blocks are stacked in a jointing manner, they may be connected to one another by a radiopaque material, such as lead. It is also possible to provide the individual building blocks with respective form-fitting surface areas such that they may be assembled in a form-fitting or form-locking manner without employing special binder materials for accomplishing a radiopaque monolithic construction body.

The size of the construction body depends on the amount of radioactive material to be stored. A construction body may, for example, have the size of a single family home but also be much larger so that the inventive depository may be designed in the manner of an "artificial mountain". Depending on the size of the radiopaque construction body it may be expedient to provide a support frame for the interior storage chamber for the radioactive material. The support frame supports within the construction body made of rock the interior storage chamber which is for example comprised of a further radiopaque construction material, i.e., has an enclosure of radiopaque material, for example, lead, concrete, or similar materials. In order to provide the construction body with a stable, balanced position over thousands of years, it is recommended to design the construction body such that its center of gravity is arranged within the vertical plane of gravity of the construction body and within its bottom half or portion adjacent to the support surface. With this measure it is possible to provide a construction body with curved outer surfaces, for example, in the shape of a sphere, a cup or similar shapes which during very strong tectonic quakes and/or lifting will only slide over a short distance, but will not uncontrollably roll.

One of the safest embodiments and accordingly a very preferred embodiment of the construction body is the shape of a tetrahedron with equilateral, triangular flat outer surfaces and a favorable center of gravity in its spatial center. A construction body in the shape of a tetrahedron can thus only tilt from its most stable position into an identical stable position or during lifting movements of the earth with slight inclines, may slide on the ground so that even in such situations the construction body remains in its optimal stable position. Accordingly, even very strong lifting movements of the ground are safe for a tetrahedron because it remains in its absolute stable position during sliding as well as during tilting and because a tilting is possible to all three sides.

DESCRIPTION OF PREFERRED EMBODIMENTS

The present invention will now be described in detail with the aid of several specific embodiments utilizing FIGS. 1 through 8.

FIG. 1 shows an approximately spherical construction body 1 supported freely on the ground surface 3 and having in its interior centrally located a storage chamber 2 for the radioactive material. This interior storage room 2 may be provided with a parallelepipedally constructed support frame 6 which encloses the storage space and which is provided with planar support surfaces for the proper construction body 1 comprised of parent rock such as for example basalt, granite etc. The individual building blocks 4 may be machined to have planar surfaces so that they may be positioned in a form-fitting manner at the support frame 6 as well as stacked relative to one another. It is also possible to provide the individual building blocks 4 with joints and stack the building blocks 4 with these joints, whereby the joints are filled with a radiopaque material, for example, lead. The form-fitting surface areas 5 of the individual building blocks 4 may be provided with form-locking means such as a groove-tongue arrangement or a dovetail connection such that an absolutely safe, direct, and tight connection of the individual building blocks 4 of the construction body 1 is ensured.

Figure 3:
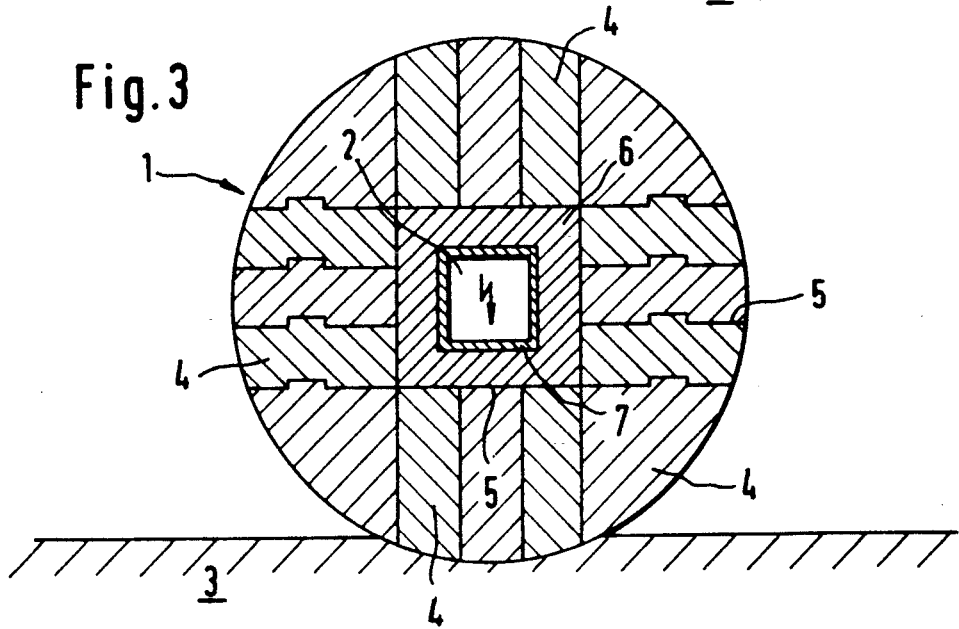
FIG. 3 shows a spherical construction body with a storage chamber that is provided with a lead enclosure.

It is also possible that the interior storage chamber 2 for the radioactive material is covered with a lead covering 7 (lead enclosures) for safety reasons (schematically represented in FIG. 3). In the embodiment according to FIG. 2 the construction body 1 is comprised of a cup-shaped bottom portion 1' and a top cover (cover portion) 1", whereby both portions are built from individual building blocks 4 in a form-locking manner or in a jointing manner. In the embodiment according to FIG. 3 the interior storage chamber 2 which is enclosed by the lead enclosure 7 is supported by a support frame 6 which is preferably surrounded by the planar surface areas 5 of the individual building blocks 4 in a form-fitting manner. The construction body according to FIG. 3 is spherical. Of course, the construction body may be provided in any other suitable shape and rests freely, that is loosely without any connection with a foundation or an anchoring means, on the ground surface 3, as shown with the construction body of FIGS. 1 and 2. In a further embodiment it is possible to arrange the individual building blocks 4 at a distance from the support frame 6 of the interior storage chamber 2 so that thereby a heat insulating intermediate space is produced. In order to prevent excessive heating of the construction body 1, the outer surface may be provided with additional heat-dissipating projections, for example, in the form of ribs, preferably made of natural rock.

As a suitable location for the inventive construction body, which may reach great dimensions of, for example, more than 100 meters in diameter, tectonically quiet or stable areas, for example, flat desert areas or parts of the arctic or antarctic regions are to be considered. When considering a location within desert areas, the dimensioning of the construction body must take into consideration erosion due to wind-borne fine sands over geological time periods as well as the possibility of the construction body being partially or entirely covered by sand dunes. An inventively embodied construction body would maintain its position despite tectonic lifting, lowering, or horizontal movements as long as the vertical movement is so slight that the surface friction of the spherical construction body is greater than gravitation. For embodiments of the construction body in the shape of a cube, a pyramid, a rhombic dodecahedron or similar shapes with planar corners, preferably in the shape of a tetrahedron, the construction body always rests with a planar base surface on the ground, for example, with a equilateral triangle. When lifting of the ground due to tectonic movements occur, a displacement of the center of gravity may result for strong enough earth movements causing a tilting moment so that especially the preferred embodiment of the construction body in the form of a tetrahedron may safely tilt about one of its edges. The resulting shock forces are a function of the mass of the tetrahedron which accordingly may not be dimensioned to any desired size. It is recommended to provide the construction body with dimensions which correspond approximately to the size of a single family home and have a height not exceeding approximately 200 meters. The shape of a flat cup also provides a safe support for the construction body since the cup may be tilted in any desired direction when the gravitational force overcomes the friction of the support surface. However, it seems impossible that such a flat cup may tilt completely about its diameter. Accordingly, this shape provides a sufficient non-tiltable positioning. This is also true when, for example, two cup-shaped portions of identical radii of curvature are combined to form a construction body similar to a muscle comprised of two shell halves. With such an arrangement it is easily possible to provide partitions in the interior of the construction body in order to stiffen the construction body in a cell-like arrangement. When, as mentioned before, the inventive construction body has relatively small dimensions (approximately the size of a single or multiple family home), such construction bodies may, for example, be installed in the arctic deserts so that "storage villages" are created within free areas of the earth not suitable for any other useful application.

In FIGS. 4 to 8 examples for embodiments of the radiopaque construction bodies in the shape of a polyhedron are schematically represented. FIG. 4 shows a construction body in the form of a cube (hexahedron). FIG. 5 shows a construction body in the form of a rhombic dodecahedron, and FIG. 6 shows a construction body in the form of pentagonal dodecahedron in a schematic representation. In FIG. 7 the cubic shape of the construction body is provided with flattened corners by superimposing the basic cubic shape with an octahedron. FIG. 8 shows a preferred embodiment of the construction body in the form of a tetrahedron which, as mentioned before, always rests with one of its four triangles on the ground surface in an absolutely stable, balanced position. When such a tetrahedral construction body, due to tectonic quakes or lifting or due to other causes, assumes a tilted position in which it might fall over there is no immediate danger for the construction body itself nor for its surroundings since the construction body on a planar ground will slide while maintaining its stable, balanced position or, if it falls over, assumes a identical stable position.

The present invention is, of course, in no way restricted to the specific disclosure of the specification and drawings, but also encompasses any modifications within the scope of the appended claims.

What I claim is:

1. An above ground depository for storing radioactive waste, comprising:
    a construction body comprised of a plurality of individual building blocks made of at least one of the materials selected from the group consisting of natural rock and magmatic rock, said material being substantially weather- and erosion-resistant;
    said building blocks safely connected to one another and forming an interior storage chamber within said construction body;
    said construction body having a size that corresponds at least to the size of a single family home and a wall thickness preventing emission of radioactive radiation during a projected storage time of several thousand years;
    said construction body having a support surface that has a shape selected from the group consisting of a planar outer surface and a convex outer surface designed to provide a free, stable support on a concave to flat ground surface without being fastened thereto such that said construction body, when tectonic movements of the earth's crust occur, exhibits free movability relative to the ground surface by providing at the same time an absolute stable and balanced position.

2. A depository according to claim 1, wherein said construction body has the shape of a tetrahedron.

3. A depository according to claim 1, wherein said construction body has a shape selected from the group consisting of a cube, a rhombic dodecahedron, and a sphere.

4. A depository according to claim 1, wherein said construction body has the shape of a spherical cup.

5. A depository according to claim 1, wherein said construction body is at least approximately semi-spherical.

6. A depository according to claim 1, wherein said construction body has the shape of an oval bowl.

7. A depository according to claim 1, wherein said construction body is comprised of at least two stacked portions made of said building blocks, said stacked portions connected to one another in a radiopaque manner.

8. A depository according to claim 7, wherein said two portions are at least approximately semi-spheres.

9. A depository according to claim 1, wherein said building blocks have form-fitting surface areas for stacking said building blocks in a radiopaque manner.

10. A depository according to claim 9, wherein said stacking of said building blocks is radiopaque without providing binder material.

11. A depository according to claim 1, further comprising a radiopaque binder material for jointingly connecting said building blocks to one another.

12. A depository according to claim 1, wherein said construction body comprises a support frame for supporting said interior storage chamber within said construction body.

13. A depository according to claim 12, wherein said interior storage chamber is comprised of a radiopaque material.

14. A depository according to claim 13, wherein said radiopaque material is selected from the group consisting of lead and concrete.

15. A depository according to claim 1, wherein a center of gravity of said construction body is located in its bottom half.

16. A depository according to claim 1, wherein said construction body has an outer surface with surface-increasing projections for increasing heat dissipation.

17. A depository according to claim 16, wherein said surface-increasing projections are ribs.

18. An above ground depository for storing radioactive waste, comprising:
   a construction body comprised of a plurality of individual building blocks made of at least one of the materials selected from the group consisting of natural rock and agmatic rock, said material being substantially weather- and erosion-resistant;
   said building blocks safely connected to one another and forming an interior storage chamber within said construction body;
   said construction body having a size that corresponds at least to the size of a single family home and a wall thickness preventing emission of radioactive radiation during a projected storage time of several thousand years; and
   said construction body having a shape of an equilateral tetrahedron with a planar outer support surface designed to provide a free, stable support on a concave to flat ground surface without being fastened thereto such that said construction body, when tectonic movements of the earth's crust occur, exhibits free movability relative to the ground surface by providing at the same time an absolute stable and balanced position.

* * * * *